US010239389B2

(12) United States Patent
Miller

(10) Patent No.: US 10,239,389 B2
(45) Date of Patent: Mar. 26, 2019

(54) CARGO TRANSPORTATION HOUSING COMPRISING A FLEXIBLE FAST DOOR

(71) Applicant: ASSA ABLOY ENTRANCE SYSTEMS AB, Landskrona (SE)

(72) Inventor: Robert J. Miller, Grayson, GA (US)

(73) Assignee: ASSA ABLOY ENTRANCE SYSTEMS AB, Landskrona (SE)

( * ) Notice: Subject to any disclaimer, the term of this patent is extended or adjusted under 35 U.S.C. 154(b) by 0 days.

(21) Appl. No.: 15/543,438

(22) PCT Filed: Feb. 4, 2016

(86) PCT No.: PCT/EP2016/052347
§ 371 (c)(1),
(2) Date: Jul. 13, 2017

(87) PCT Pub. No.: WO2016/124672
PCT Pub. Date: Aug. 11, 2016

(65) Prior Publication Data
US 2018/0001750 A1    Jan. 4, 2018

(30) Foreign Application Priority Data

Feb. 4, 2015 (SE) .................................. 1550119

(51) Int. Cl.
*B60J 5/04* (2006.01)
*B60J 5/06* (2006.01)
*B60P 3/20* (2006.01)
*B60J 5/10* (2006.01)
(Continued)

(52) U.S. Cl.
CPC ............ *B60J 5/0497* (2013.01); *B60J 5/065* (2013.01); *B60J 5/067* (2013.01); *B60J 5/108* (2013.01);
(Continued)

(58) Field of Classification Search
CPC .......... B60J 5/04; B60J 5/0493; B60J 5/0497; B60J 5/062; B60J 5/065; B60J 5/08; B60P 3/20; B60P 3/205
(Continued)

(56) References Cited

U.S. PATENT DOCUMENTS

| 2,464,923 A | * | 3/1949 | Davis | ........................ B60P 3/20 |
| | | | | 296/24.35 |
| 2,782,846 A | * | 2/1957 | Bussard | ................. B60J 1/2011 |
| | | | | 16/93 D |

(Continued)

FOREIGN PATENT DOCUMENTS

GB           976542         11/1964

OTHER PUBLICATIONS

International Search Report mailed in corresponding PCT Application PCT/EP2016/052347 dated May 6, 2016.
(Continued)

*Primary Examiner* — Jason S Daniels
(74) *Attorney, Agent, or Firm* — Wissing Miller LLP

(57) ABSTRACT

The present invention concerns a housing (1) for the transportation of a cargo, such as truck trailers, housings mounted on the chassis of a truck, or shipping containers. The housing of the present invention comprises: (a) walls (1R) defining a closed inner space (1i), (b) an opening (2) provided in one of the walls, and further comprises a rigid door comprising one or more rigid panels (3) which are movable to seal or unseal said opening (2); (c) a flexible fast door comprising a motorized driving mechanism (10) suitable for moving a leading edge (4L) of a flexible shutter (4), wherein the flexible shutter (4) comprises two lateral edges engaged in parallel guiding rails (7) fixed to two parallel and opposite edges of the opening (2), wherein the rigid panel (3) and/or
(Continued)

the parallel edge of the opening (2) is provided with a groove to accommodate the guiding rails (7).

18 Claims, 5 Drawing Sheets

(51) Int. Cl.
  *B60J 5/14* (2006.01)
  *B60J 5/08* (2006.01)
(52) U.S. Cl.
  CPC ............... *B60J 5/14* (2013.01); *B60P 3/205* (2013.01); *B60J 5/08* (2013.01)
(58) Field of Classification Search
  USPC ...................................... 296/146.8, 152, 155
  See application file for complete search history.

(56) References Cited

U.S. PATENT DOCUMENTS

| 3,724,526 | A | * | 4/1973 | Huprich | .................. B60J 5/125 |
| | | | | | 160/368.1 |
| 4,669,775 | A | | 6/1987 | Mathers | |
| 2004/0107712 | A1 | | 6/2004 | Moran | |
| 2009/0142154 | A1 | | 6/2009 | Hammond | |
| 2010/0181033 | A1 | | 7/2010 | Bostyn | |
| 2010/0270826 | A1 | | 10/2010 | Weeda | |

OTHER PUBLICATIONS

International Search Report mailed in priority application SE 1550119-0 dated Sep. 7, 2015.

\* cited by examiner

CARGO TRANSPORTATION HOUSING COMPRISING A FLEXIBLE FAST DOOR

This application is a 371 of PCT/EP2016/052347 filed on Feb. 4, 2016, published on Aug. 11, 2016 under publication number WO 2016/124672, which claims priority benefits from Swedish Patent Application No. 1550119-0 filed Feb. 4, 2015, the disclosure of which is incorporated herein by reference.

TECHNICAL FIELD

The present invention concerns a housing for transportation of a cargo, such as truck trailers, housings mounted on the chassis of a truck, intermodal freight containers or freight train wagons. Said housing comprises walls defining an inner space for the storing of a cargo. One of the walls is provided with an opening to give access to the inner space from the exterior, which opening can be sealed or opened by means of a rigid door. The present invention proposes a solution for rapidly sealing the opening during loading or unloading of the inner space in order to maintain the atmospheric conditions within the inner space relatively constant in spite of the coming and going of an operator carrying goods, as well as for preventing unauthorized access to the inner space while the housing is out of sight from said operator.

BACKGROUND OF THE INVENTION

Goods are transported all over the world from production sites to transformation plants, to industry, distribution and retailing centres, to shops, restaurants and end-users. At each stage of the transportation chain, goods must be loaded into a transportation container or housing at their starting point and unloaded at their arrival points. Such transportation housings can be transported by ship, plane, truck, or rail. During the loading or unloading of the housing, goods are transported across an opening defined in a wall of such housings into or out of an inner space wherein goods can be stored. Access through the opening is allowed by a rigid door, which can be opened or closed to give access to the inner space from the exterior or to seal the opening. Often, different goods stored in a transportation housing may have different delivery addresses, so that the last good to be delivered has remained the longest in the inner space and has been exposed to frequent openings and closings of the rigid door. The loading or unloading of goods can last quite some time, if the operator must transfer goods from the transportation housing to a storing place or reverse. Since the rigid door(s) are usually cumbersome to open and close, and an operator has its hands busy with a trolley or trolley jack, they often remain open during the whole duration of an unloading or loading operation.

Some cargoes, however, are sensitive to changes in the environmental storing conditions. For example, many goods must be stored in a refrigerated environment, or within a controlled level of relative humidity to preserve them during transportation. In particular this concerns foodstuff, for example frozen or cooled meat, fish, vegetable, semi-prepared plates, fruits, drinks, and the like. It is important never to break to cold chain lest bacteria start spreading. It can also concern medicines, sensitive electronic equipment, biological material, and the like. The longer the rigid door remains open during a loading or unloading operation, more the environmental storing conditions are likely to be affected with possibly severe consequences on the preservation of the cargo.

Furthermore, if an operator loses the transportation container from sight when transferring goods between the container and a storing place, unauthorized people can penetrate within the inner space of the transportation housing and steal or damage the goods stored therein.

There therefore remains a need in the art for allowing the closing of an access aperture in a transportation container every time the crossing of such aperture is not required, and allowing the opening thereof when crossing of the aperture is desired. The present invention provides a housing for the transportation of a cargo capable of rapidly and easily opening and closing a shutter over such access opening, to maintain the inner space of the housing separated from the outside. This and other advantages of the present invention are presented in continuation.

SUMMARY OF THE INVENTION

The present invention is defined in the appended independent claims. Preferred embodiments are defined in the dependent claims. In particular, the present invention concerns a housing for the transportation of a cargo comprising:
(a) walls defining a closed inner space suitable for storing a cargo,
(b) an opening provided in one of the walls and giving access to the closed inner space from an outer atmosphere, and further comprises a rigid door comprising one or more rigid panels which are movable to seal or unseal said opening;
(c) a flexible fast door comprising a motorized driving mechanism suitable for moving a leading edge of a flexible shutter in a first direction to close the flexible shutter and thus seal said opening, and in a second, opposite direction to open the flexible shutter and thus unseal said opening, when said opening is unsealed by the rigid door, wherein the flexible shutter comprises two lateral edges engaged in parallel guiding rails fixed to two parallel and opposite edges of the opening, wherein the rigid panel and/or the parallel edge of the opening is provided with a groove to accommodate the guiding rails.

A housing according to the present invention is typically selected among one of the following:
A truck trailer;
A cargo housing mounted on the chassis of a truck;
A cargo compartment in a van;
An intermodal freight container; or
A freight train wagon.

The present invention is particularly advantageous for housings wherein the temperature and/or humidity in the inner space are controlled, typically, the inner space can be refrigerated.

The flexible shutter may be selected from a flexible curtain or an articulated shutter formed by a series of parallel laths hinged to one another parallel to the leading edge. When the flexible shutter is at least partially open, the portion of flexible shutter not sealing the opening is preferably stored either (a) rolled-up around a storing drum or (b) partially wrapped about a rotating axle and stretched in a storing direction, transverse to the direction along which the leading edge is moved to open and close the flexible shutter.

There are different options for driving the movement of the leading edge to open or close a flexible shutter as described above. For example, the motorized driving mechanism may drive the rotation of the storing drum or of the rotational axle to move the leading edge in a first direction to close the flexible shutter and in a second direction to open the flexible shutter. In an alternative embodiment the motorized driving mechanism may pull or push linearly the flexible shutter.

In some embodiments, when the flexible shutter seals the opening, the flexible shutter occupies space that is occupied by the rigid panel when the rigid panel seals the opening. In some embodiments, the guiding rail does not protrude further towards the inner of the closed inner space than the rigid panel does when the rigid panel seals the opening.

In some embodiments, the rigid panel is provided with the groove such that the guiding rail is nested when the rigid panel seals the opening. In some embodiments, the parallel edge of the opening is provided with the groove such that the guiding rail is accommodated flush with a plane defined by said edge.

In some embodiments, the flexible shutter is prevented from being closed to seal the opening while the rigid door seals the opening.

In a preferred embodiment of the present invention, the flexible shutter comprises two lateral edges engaged in parallel guiding rails defining two sides of the opening. The leading edge links the two lateral edges and moves along the direction defined by the guiding rails upon closing and opening the flexible shutter. The opening is limited by edges defined either by edges defined by the portion of wall surrounding the opening, or by edges of a door frame. The guiding rails are fixed to two parallel and opposite edges of the opening. Preferably, said edges have a thickness. In order to reduce the hindrance of the flexible fast door, it is preferred that the guiding rails do not protrude beyond the thickness of the edges defining the opening.

The two lateral edges of the flexible shutter preferably comprise a bead or a series of adjacent teeth, slideably engaged in an opening of the corresponding guiding rail. To prevent damages to the flexible fast door, it is preferred that the bead or series of adjacent teeth can be extracted from the opening of the corresponding rail under the action of a defined force directed transversely to the guiding rail. In a preferred embodiment, the flexible fast door comprises a means for reinserting into the guiding rail opening the bead or series of adjacent teeth that has been extracted therefrom, this means comprising a guide member which is positioned facing the guiding rail opening and which is designed so that, while the flexible shutter is being opened, it deflects toward the guiding rail opening the bead or series of adjacent teeth that has been extracted from this guiding rail opening, wherein the guide member comprises at least one pair of rollers having fixed axes of rotation which are located symmetrically on each side of the mid-plane of the flexible shutter, in the same plane substantially perpendicular to said mid-plane of the flexible shutter and are directed obliquely with respect to said mid-plane of the flexible shutter so that the rollers converge toward the bottom of the guiding rail opening and roll, as the flexible shutter is moved in the opening direction, along the bead or series of teeth which has been extracted from the guiding rail opening, pushing it into the guiding rail opening.

The motorized driving mechanism can be actuated to open and close the flexible door by means of one or more of:
- a switch mounted in the vicinity of the flexible door, and/or
- a remote control, and/or
- an opening sensor programmed to open the flexible shutter automatically upon detection of an appropriate opening signal, and/or
- a closing sensor programmed to close the flexible shutter automatically upon detection of an appropriate closing signal.

The opening sensor is preferably programmed to open the flexible shutter automatically upon detection of one or more of the following opening signals individually or in combination:
(a) Detection of a movement within a given area around the flexible fast door;
(b) Detection of a person or object within a given area around the flexible fast door;
(c) Detection of digital credentials within a given area around the flexible fast door;
(d) Optical detection of a graphical element worn by an accredited operator,
(e) Detection of a wave signal or of the presence of a transponder;
(f) Detection of a voice signal;
(g) Closing of the rigid door.

The closing sensor is preferably programmed to close the flexible shutter automatically upon detection of one or more of the following closing signals individually or in combination:
(a) Detection of the passage of a person through the opening;
(b) Loss of a signal indicating the presence of a person or object within a given area around the flexible fast door;
(c) Loss of a wave signal;
(d) Detection of a voice signal;
(e) Expiration of a pre-set opening time.

The closing sensor is preferably coupled to a safety feature preventing an automatic closure of the flexible shutter in case the presence of an object or person is detected within a given area around the flexible door.

BRIEF DESCRIPTION OF THE FIGURES

For a fuller understanding of the nature of the present invention, reference is made to the following detailed description taken in conjunction with the accompanying drawings in which.

DETAILED DESCRIPTION OF THE INVENTION

Figure 1:
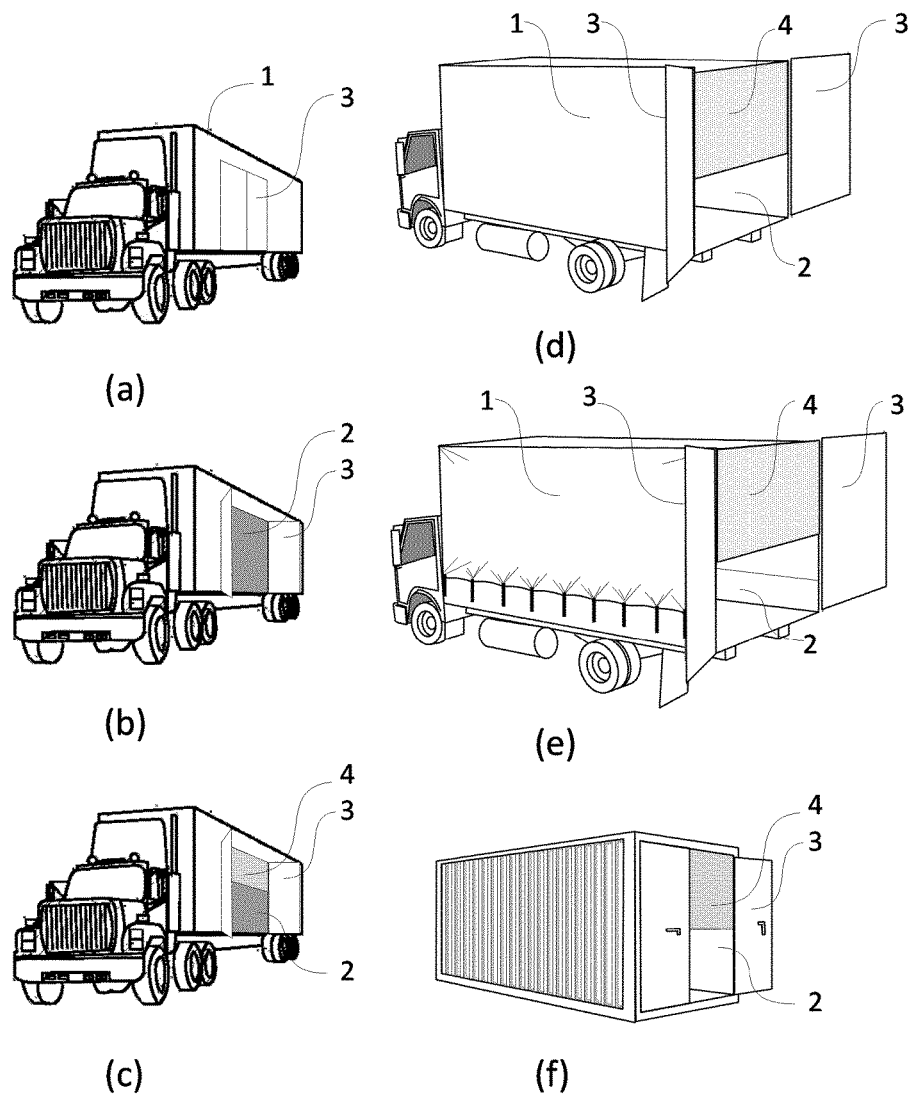
FIG. 1: shows various types of transportation housings according to the present invention.

As illustrated in FIG. 1, a housing (1) according to the present invention can be in the form of a truck trailer as shown in FIG. 1(a)-(c), a housing mounted on the chassis of a truck, as illustrated in FIG. 1(d)&(e), a cargo compartment in a van, an intermodal freight container, as depicted in FIG. 1(f), a freight train wagon, and the like.

Such containers comprise walls defining a closed inner space (1i) suitable for storing a cargo. At least one of said walls, preferably all of them, can be rigid walls. A rigid wall is meant herein as a self-supported wall, by contrast to flexible walls which require a supporting frame for holding them in place, such as housings covered by a flexible tarpaulin as illustrated in FIG. 1(e). A housing according to the present invention may either comprise no rigid wall (they are all flexible walls as in FIG. 1(e)); or comprise at least one rigid wall, or all the walls are rigid (as in FIG. 1(a)-(c)&(f)).

One of the walls is provided with an opening (2) giving access to the closed inner space (1i) from the exterior. In case of a rigid wall, the opening is defined by the edges of the portion of rigid wall surrounding the opening. In case of a flexible wall, such as a tarpaulin, the opening is defined by a frame (1F) ensuring mechanical stability under normal conditions of use of the opening (cf. FIGS. 1(e) and 4(b)). The opening can have an area smaller than the one of the wall it pierces, as illustrated in FIG. 1(a) to (c), or it may extend over substantially the whole area of a wall, especially a wall located at the rear of the container, as illustrated in FIG. 1(d) to (f).

Figure 4:
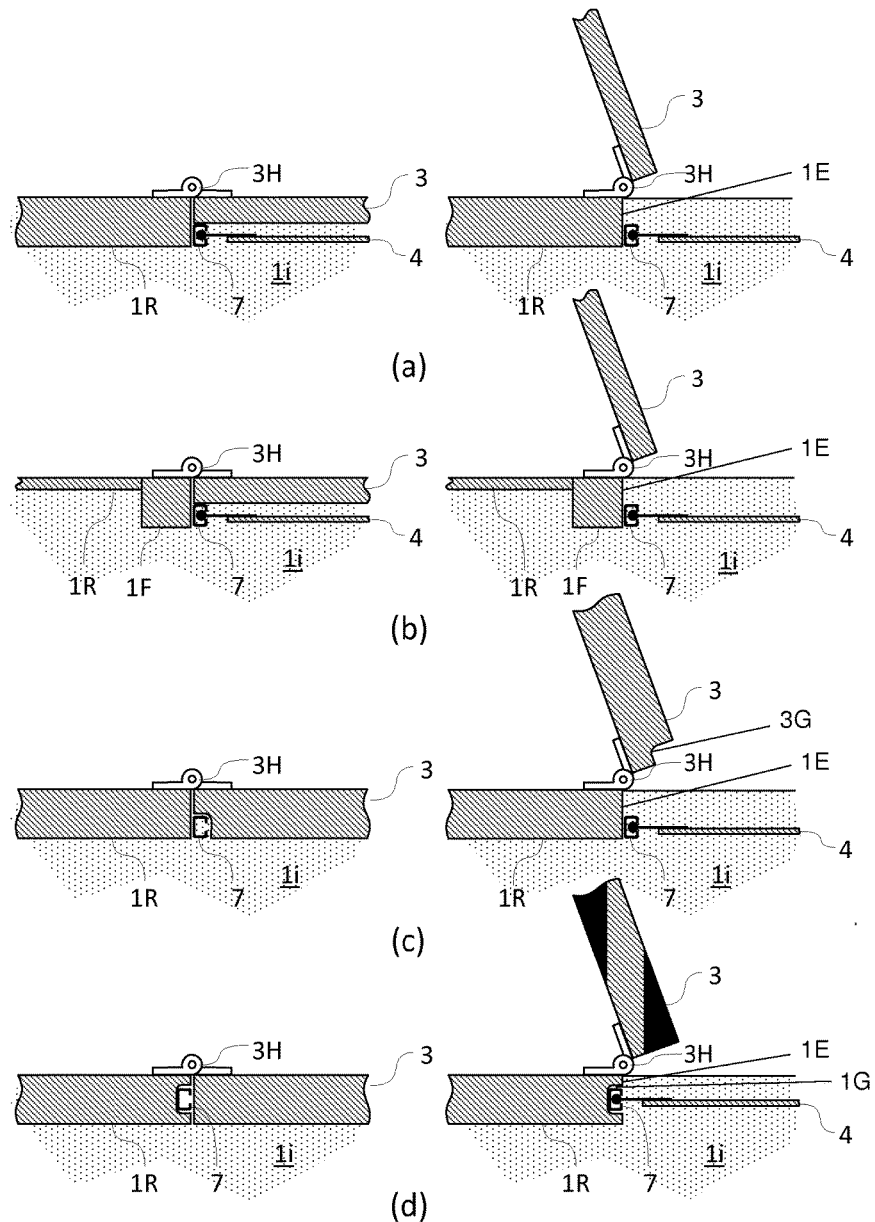
FIG. 4: shows top cut views of various arrangements of rigid door and flexible shutter according to the present invention.
Figure 5:
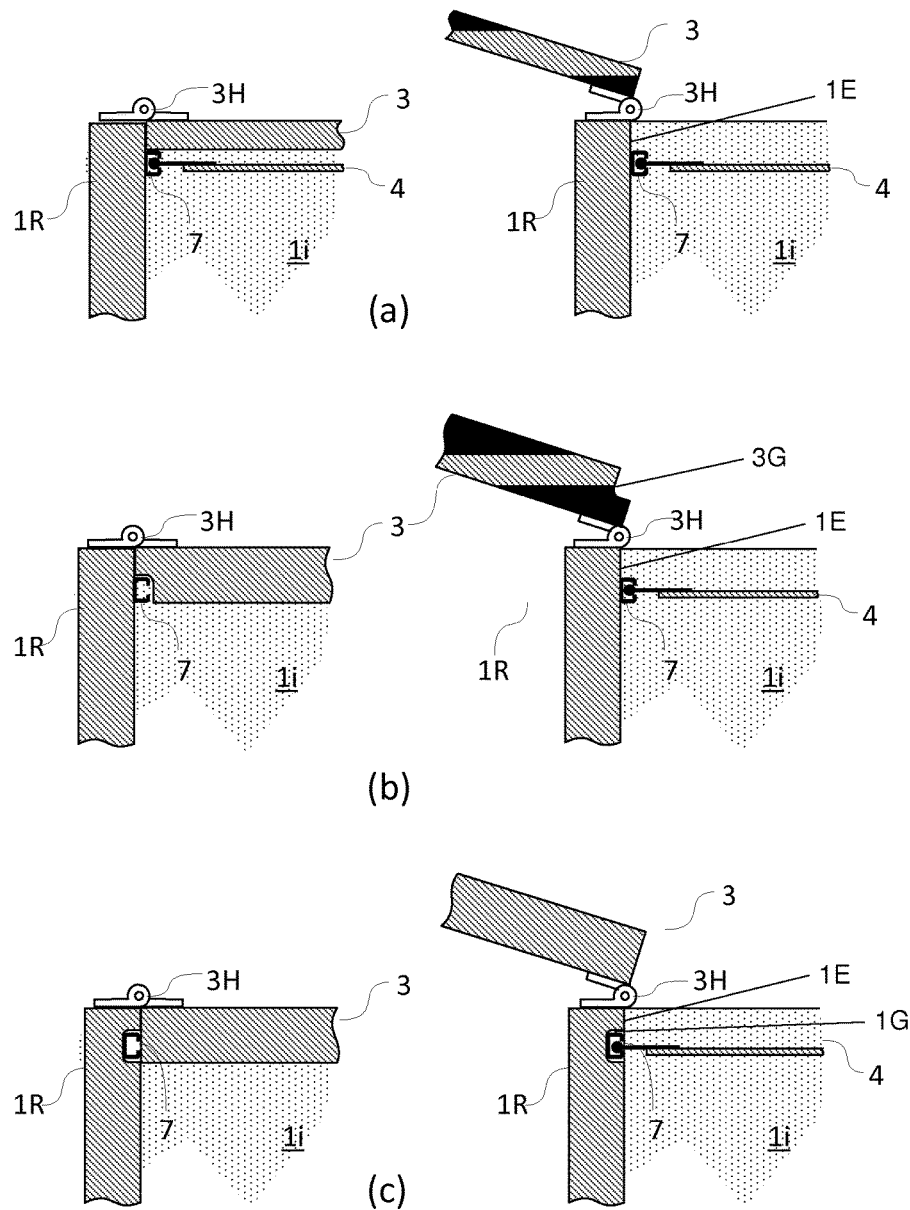
FIG. 5: shows top cut views of various arrangements of rigid door and flexible shutter according to the present invention.

Said wall further comprises a rigid door comprising one or more rigid panels (3) which are movable to seal or unseal said opening (2). Again, a rigid panel is defined herein as a mechanically self-supported panel. It can be a rigid board, or it may consist of a not necessarily rigid material, even a flexible tarpaulin, stretched over a rigid frame, as long as the panel (3) as a whole is mechanically stable. An opening is sealed by a rigid door generally comprising either a single rigid panel (cf. FIG. 2), or a pair of rigid panels (cf. FIG. 1). The rigid panels (3) can be mounted on hinges (3H) as shown in FIGS. 4&5 or they can be sliding panels. In some cases, the rigid panel can be a platform which can be tilted horizontally and lowered and raised hydraulically.

The gist of the present invention is, as shown in FIGS. 1(c), (d)-(f), to provide a transportation housing as described supra with a flexible fast door comprising a motorized driving mechanism (10) suitable for moving a leading edge (4L) of a flexible shutter (4) in a first direction to close the flexible shutter and thus seal said opening, and in a second, opposite direction to open the flexible shutter and thus unseal said opening. Such closing and opening of the flexible shutter must be possible at least when said opening is unsealed by the rigid door.

A flexible fast door is a family of doors comprising a flexible shutter (4) which is generally lighter than rigid panels (3), and can thus be moved at high speed. A flexible shutter (4) can be a flexible curtain (cf. FIG. 3(a)&(b)) or, alternatively, it can be an articulated shutter formed by a series of parallel laths (4S) hinged to one another parallel to the leading edge (4L) (cf. FIG. 3(c)). Unlike hinged rigid doors, which open out of the plane defined by the opening edges, the motorized driving mechanism of a flexible fast door drives the moving of the leading edge (4L) of the flexible shutter parallel to the plane of the opening, as shown in FIGS. 2(a)&(c) and 3. Because the space in a transportation housing is limited and reserved for storing a cargo, it follows that when open the shutter must be stored in a way occupying as little space as possible. For this reason, a shutter suitable for the present invention must be flexible, which is understood herein, as sufficiently deformable for being at least partially wrapped around a rotating axle.

Figure 2:
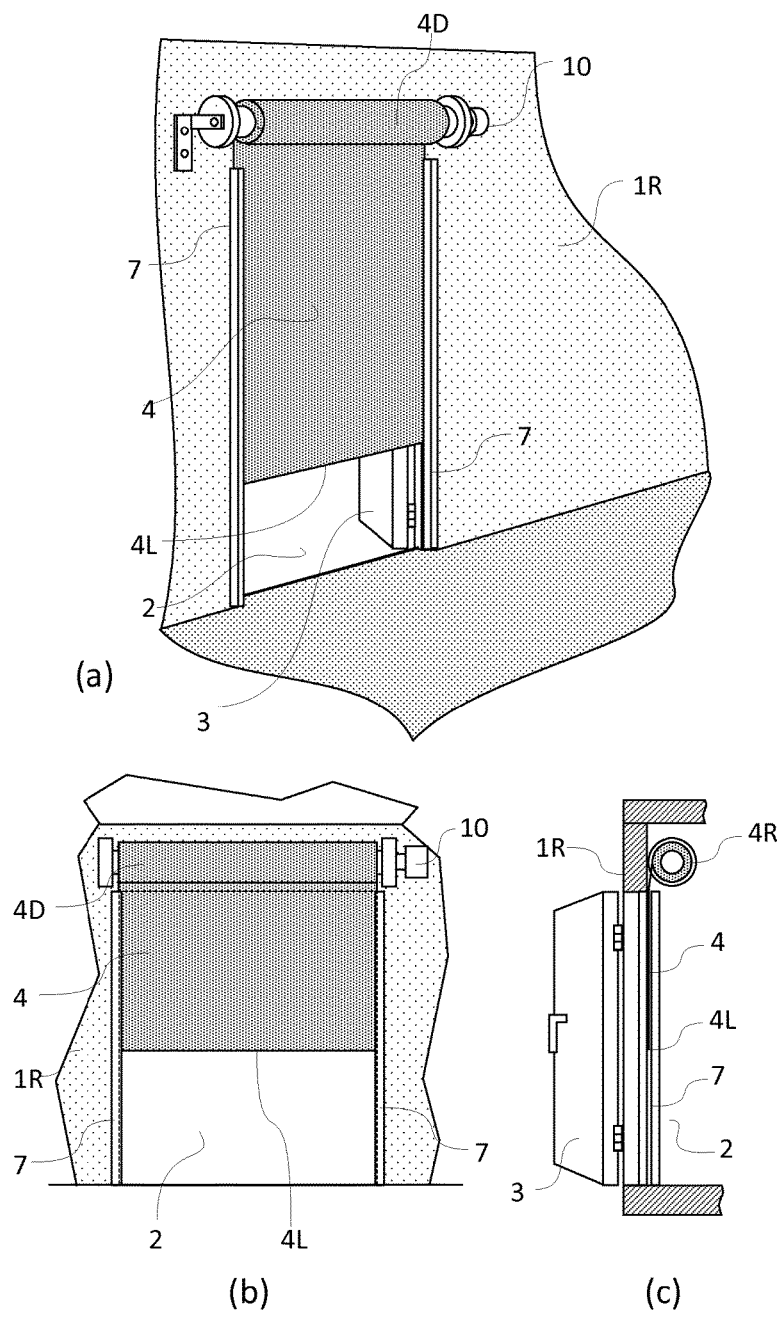
FIG. 2: shows an embodiment of a flexible shutter used in the present invention, (a) perspective view, (b) front view, and (c) side cut view.
Figure 3:
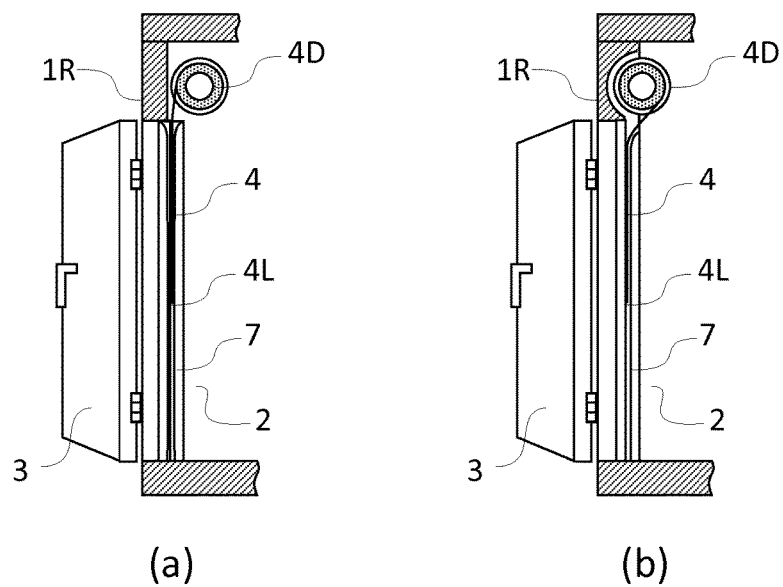
FIG. 3: shows side cut views of various embodiments of flexible shutters suitable for the present invention.

As shown in FIGS. 2 and 3(a)&(b), the flexible shutter can be wound on and unwound from a drum (4D) to open and close the flexible shutter, respectively. The motorized driving mechanism preferably rotates the drum to wind and unwind the flexible shutter. Other driving mechanisms are possible, such as chains or cables, or a hydraulic or pneumatic piston pulling the lateral edges, leading edge, or trailing edge (opposite the leading edge) of the flexible shutter.

Alternatively, as shown in FIG. 3(c) the flexible shutter can be partially wrapped around a rotatable axle to change the orientation of the flexible shutter. In the case of a housing for transportation of goods, such a system would preferably change the orientation of the flexible shutter by 90° from a plane parallel to (preferably co-planar with) the plane defined by the opening edges to a plane parallel to a ceiling of the inner space (1i) of the housing. In order to guide the flexible shutter parallel to the ceiling, transverse guiding rails (7T) can be fixed to the ceiling as shown in FIG. 3(c). The motorized driving mechanism of such system can drive the rotation of the axle, or may comprise chains or cables, or a hydraulic or pneumatic piston pulling the lateral edges, leading edge, or trailing edge (opposite the leading edge) of the flexible shutter.

The flexible fast door must occupy as little space as possible within the inner space (1i) in order to maintain the original loading capacity of the housing (i.e., without a flexible fast door). For this reason, a drum (4D) is preferably used with flexible curtains, because the diameter of the drum can be maintained smaller than with an articulated shutter. Making without a drum as shown in FIG. 3(c) by changing the orientation of the flexible shutter saves space compared with a drum, but reduces the inner space height available for storing goods at the level of the opening. It is, however, advantageous for articulated shutters because the drum diameter required to wind an articulated shutter would probably be too large for many applications. In order to further save space, the drum (4D) can be, as illustrated in FIG. 3(b), partly encased within the thickness of the wall surrounding the opening.

As shown in FIGS. 2 to 5, the flexible shutter (4) comprises two lateral edges which are preferably engaged in parallel guiding rails (7) defining two sides of the opening. The leading edge (4L) links the two lateral edges and moves along the direction defined by the guiding rails upon closing and opening the flexible shutter. The guiding rails (7) can be fixed to the inner side of the wall surrounding the opening. It is, however, much preferred if they fixed to two opposite facing edges (1E) defining the thickness of the wall (1R) or frame (1F) surrounding the opening. Again, for reducing the volume loss available for storing goods caused by the presence of the flexible fast door, it is preferred that the guiding rails (7) do not protrude beyond the thickness of the edges (1E). FIGS. 4&5, show several designs allowing such effect to be reached, with the rigid door being closed on the left hand illustrations and open in the right hand illustrations. FIG. 4 shows an opening in the plane of the wall surrounding it such as in containers illustrated in FIG. 1(a) to (c), whilst FIG. 5 illustrates an opening adjacent to a second wall transverse to the plane of the opening, such as in containers shown in FIG. 1(d) to (f). The edges (1E) of the opening (2), i.e. the opposite facing edges (1E) of the opening (2), are parallel edges (1E) and may be vertical edges.

For example, as shown in FIG. 4(a)&(b), if the rigid panel(s) (3) of the rigid door has a thickness lower than the thickness of the wall (1R) or frame (1F) surrounding the opening (2), then the guiding rails can be fixed to the portions of the opposite facing edges of the opening which are left free by the thinner rigid panel(s) (3). This configuration, is however, not always possible, because the rigid panel(s) (3) may be required to have the same thickness as the wall or frame surrounding the opening (2). Several embodiments are possible to meet such design.

In some embodiments, the rigid panel (3) and/or the parallel edge (1E) of the opening (2) is provided with a groove (1G, 3G) to accommodate the guiding rails (7) as shown in FIGS. 4(*c*)&(*d*) and 5(*b*)&(*c*). Thereby, when the rigid panel is open the flexible shutter is guided within the space where the rigid panel is located when the rigid panel is closed. Thus, the space that the flexible shutter occupies is reduced and in particular the flexible shutter does not need any the floor area, but preserves the amount of floor area in a housing without a flexible shutter. Further, the risk of crushing the flexible shutter into or entangling the flexible shutter with goods present in the housing is eliminated or at least reduced, since the flexible shutter is guided within the space that the rigid panel occupies when closed. In some embodiments, the rigid panel (3) is provided with the groove (3G) such that the guiding rail (7) is nested when the rigid panel (3) seals the opening (2). Thereby, the guiding rail is embraced by the rigid panel. In some embodiments, the parallel edge (1E) of the opening (2) is provided with the groove (1G) such that the guiding rail (7) is accommodated flush with a plane defined by said edge (1E). Thereby, the guiding rail is depressed into the edge and does not obstruct the rigid panel or the pathway through the opening. In a first embodiment, the rigid panel (3) may be provided with a groove (3G) suitable for nesting the guiding rail (7) when the rigid panel (3) is closed, as shown in FIGS. 4(*c*)&5(*b*). In an alternative embodiment, it is the two opposite, parallel edges (1E) of the opening (2) which may be provided with a groove (1G) to accommodate the guiding rail (7), flush with the plane defined by said edge (1E), as shown in FIGS. 4(*d*) and 5(*c*). For example in these two embodiments, the flexible shutter (4) may be prevented from being closed to seal the opening (2) while the rigid door seals the opening. The rigid door may be prevented from being closed to seal the opening (2) while the flexible shutter (4) seals the opening. The flexible shutter (4) can be closed only when the rigid door is open and the rigid door can only be closed when the flexible shutter is open. The great advantage of the foregoing fixings of the guiding rails is that the encumbrance of the flexible door is reduced to a minimum.

The groove (3G) of the rigid panel (3) may be arranged in a surface of the rigid panel (3) facing the parallel edge (1E) of the opening (2). In some embodiments, the groove (3G) of the rigid panel (3) is arranged in a surface of the rigid panel (3) covered by the parallel edge (1E) when the rigid panel (3) seals the opening (2). The guiding rail (7) accommodated in the groove (3G) of the rigid panel (3) when the rigid panel (3) seals the opening (2) may be covered by the parallel edge (1E) when the rigid panel (3) seals the opening (2). The guiding rail (7) accommodated in the groove (3G) of the rigid panel (3) when the rigid panel (3) seals the opening (2) may not be accessible when the rigid panel (3) seals the opening (2), i.e. it may not be possible to move the flexible shutter (4) along the guiding rail (7) when the rigid panel (3) seals the opening (2). In some embodiments, the groove (3G) of the rigid panel (3) is arranged in the inner corner of the rigid panel (3), i.e. in the corner of the rigid panel (3) facing the inner space (1*i*) when the rigid panel (3) seals the opening, as shown in FIGS. 4(*c*) and 5(*b*). This facilitates smooth and unobstructed closing of the rigid panel. The inner corner may also face the parallel edge (1E) of the opening (2) when the rigid panel seals the opening (2). The groove (3G) of the rigid panel (3) may be arranged in a corner of the rigid panel (3). The corner of the rigid panel may be a vertical corner. Alternatively, the groove of the rigid panel may be arranged displaced from the inner corner towards the outside of the rigid panel (not shown). However, in the latter arrangement where the groove is displaced from the inner corner, the width of the groove should be somewhat larger than otherwise required in order to not obstruct closing of the rigid panel and to facilitate smooth and easy closing of the rigid panel.

The groove (1G) of the parallel edge (1E) of the opening (2) may be arranged in a surface of the parallel edge (1E) facing the rigid panel (3). In some embodiments, the groove (1G) of the parallel edge (1E) is arranged in a surface of the parallel edge (1E) covered by the rigid panel (3) when the rigid panel (3) seals the opening (2). The guiding rail (7) accommodated in the groove (1G) of the parallel edge (1E) may be covered by the rigid panel (3) when the rigid panel (3) seals the opening (2). The guiding rail (7) accommodated in the groove (1G) of the parallel edge (1E) may not be accessible when the rigid panel (3) seals the opening (2), i.e. it may not be possible to move the flexible shutter (4) along the guiding rail (7) when the rigid panel (3) seals the opening (2). In some embodiments, the groove (1G) of the parallel edge (1E) of the opening (2) is arranged in line with the inner surface of the rigid panel (3) and extending in the width direction of the groove (1G) towards the outside of the rigid panel (3) when the rigid panel (3) seals the opening (2), as shown in FIG. 5(*c*), or the groove (1G) of the parallel edge (1E) of the opening (2) is displaced from the inner surface of the rigid panel (3) towards the outside of the rigid panel (3) when the rigid panel (3) seals the opening (2), as shown in FIG. 4(*d*).

The width of the groove (1G, 3G) may correspond to the width of the guiding rail (7). In some embodiments, the depth of the grove (1G, 3G) corresponds to the depth of the guiding rail (7).

In some embodiments, at least two of the rigid panel (3) and the parallel edges (1E) are provided with a groove (1G, 3G) to accommodate the guiding rails (7). At one lateral edge of the flexible shutter (4) the groove (1G, 3G) may be provided in the rigid panel (3) or in the parallel edge (1E) and at the other lateral edge of the flexible shutter (4) the groove (1G, 3G) may be provided in the rigid panel (3) or in the parallel edge (1E). Preferably, each groove (1G, 3G) accommodates a guiding rail (7). A guiding rail (7) is accommodated in a groove (1G) of the parallel edge (1E) of the opening (2). A groove (3G) of the rigid panel (3) accommodates a guiding rail (7) when the rigid panel (3) seals the opening (2). In some embodiments, at one or both of the lateral edges of the flexible shutter (4) a groove (1G, 3G) is provided both in the rigid panel (3) and in the parallel edge (1E), wherein the guiding rail (7) is partly depressed in the groove (1G) of the parallel edge (1E) and the guiding rail (7) is partly accommodated in the groove (3G) of the rigid panel when the rigid panel seals the opening (not shown), preferably the depth of the groove (1G) of the parallel edge (1E) is smaller than the depth of the guiding rail (7), also preferably the depth of the groove (3G) of the rigid panel (3) is smaller than the depth of the guiding rail (7). In such case, the depth of the groove (1G) of the parallel edge (1E) and the depth of the groove (3G) of the rigid panel (3) may together correspond to the depth of the guiding rail (7).

In some embodiments, when the flexible shutter (4) seals the opening (2), the flexible shutter (4) occupies space that is occupied by the rigid panel (3) when the rigid panel (3) seals the opening (2). Thereby, the extra space within the inner space that the flexible shutter occupies is reduced. In particular, the same floor area can be used for storing goods also when the housing is equipped with the flexible shutter. In some embodiments, the guiding rail (7) does not protrude further towards the inner of the closed inner space (1*i*) than the rigid panel (3) does when the rigid panel (3) seals the opening (2). Thereby, the effect of the flexible shutter on the space within the inner space is reduced. In particular, the floor area within the inner space of the housing is not affected by the presence of the guiding rail and the flexible fast door.

The groove (3G) of the rigid panel (3) may be denoted rigid panel groove (3G). The groove (3G) of the rigid panel (3) may be a vertical groove, i.e. vertically arranged. The groove (1G) of the edge (1E) of the opening (2) may be denoted edge groove (1G). The groove (1G) of the edge (1E) of the opening (2) may be a vertical groove, i.e. vertically arranged. The guiding rails (7) may be vertical guiding rails, i.e. vertically arranged.

The guiding rails (7) serve to guide the lateral edges of the flexible shutter (4) during the moving of the leading edge (4L) which bridges them. The guiding rails (7) preferably comprise a longitudinal opening and the two lateral edges of the flexible shutter (4) comprise a bead or a series of adjacent teeth, which are slideably engaged in said opening of the corresponding guiding rail (7), as can be seen in FIGS. 4&5. With such system, even a flexible curtain is nicely stretched across the opening, with no or little wrinkles. Furthermore, the bead or series of teeth give the flexible door a good stability against drafts and wind, maintaining the flexible shutter in place regardless of the conditions reigning on either side of the flexible shutter. In case the stress on the flexible shutter became too high, such as in case of strong wind or of an accidental impact, it is preferred that the bead or series of adjacent teeth can be extracted from the opening of the corresponding rail under the action of a defined force directed transversely to the guiding rail. This safety feature ensures that the flexible shutter is not damaged by an excessive stress, since as soon as the lateral edges of the flexible shutter are released from the grip of the guiding rails, the force is reduced instantaneously.

In one embodiment, the flexible door comprises a reinsertion system of the flexible shutter into the guiding rails, in case it was disengaged from the guiding rails as discussed supra. A simple system illustrated in FIG. 3(*a*)&(*b*) is to ensure that the breadth of the opening on each guiding rail increases and flares out at the ends thereof adjacent to the drum (4D) or rotating axle. In case the lateral edges of the flexible shutter were released from the guiding rails, the lateral edges of the flexible shutter could be reintroduced into the opening by first opening the flexible shutter until the leading edge (4L) of the flexible shutter reaches the level of the flaring out opening, then introducing the bead or teeth into the opening at its widest width, and finally driving the leading edge (4L) down toward its closed position to fully engage the bead or series of teeth in the guiding rail openings. This operation requires human intervention.

An automatic reinsertion system in case of removal of the lateral edges of the flexible shutter from the guiding rails is described in WO2008155292. The automatic reinsertion system for reinserting into the opening of the guiding rail the bead or series of adjacent teeth that has been extracted therefrom, comprises a guide member which is positioned facing the guiding rail opening and which is designed so that, while the flexible shutter is being opened, it deflects toward the guiding rail opening the bead or series of adjacent teeth that has been extracted from this guiding rail opening. The guide member comprises at least one pair of rollers having fixed axes of rotation which are located symmetrically on each side of the mid-plane of the flexible shutter, in the same plane substantially perpendicular to said mid-plane of the flexible shutter and are directed obliquely with respect to said mid-plane of the flexible shutter so that the rollers converge toward the bottom of the guiding rail opening and roll, as the flexible shutter is moved in the opening direction, along the bead or series of teeth which has been extracted from the guiding rail opening, pushing it into the guiding rail opening.

The present invention is advantageous over the prior art transportation housings in that the time the opening (2) is left open during loading and unloading operations is reduced to a minimum. This is of course particularly interesting in cases where the temperature and/or humidity in the inner space (1*i*) must be controlled, for example for refrigerated inner spaces (1*i*) for the transportation of temperature and/or humidity sensitive cargoes as discussed in introduction. It is also advantageous to prevent any unauthorized person to penetrate into the inner space of the housing in the absence of the operator in charge of the loading or unloading. The motorized flexible fast door must therefore be fast to close and open, but it is important too that the closing and opening of the flexible shutter can be actuated very easily. An easy actuation of the closing and opening ensures that an operator will diligently use the flexible fast door to seal the opening, when no passage through said opening is required. In a preferred embodiment, the motorized driving mechanism can therefore be actuated to open and close the flexible door by means of one or more of:

- A switch mounted in the vicinity of the flexible door. This is certainly the most straightforward means for actuating the closing and opening of the flexible shutter. Such switch is preferably located within the inner space of the housing, because if it were located in the outer side of the wall surrounding the opening, anyone, even unauthorized person could open the door.
- A remote control can be used. Any remote control known in the art of the type used for opening a garage can be used in the present invention. A remote control may send a signal to a processor of the motorized driving mechanism (10) to trigger the opening or closing of the flexible shutter. The signal can be in the radio frequencies, it can be a Bluetooth or wifi signal, and the like. The remote control can be worn by an authorized operator in its pocket, hanging around the neck, or fixed at the wrist, like a watch.
- An opening sensor programmed to open the flexible shutter automatically upon detection of an appropriate opening signal, and/or
- A closing sensor programmed to close the flexible shutter automatically upon detection of an appropriate closing signal.

The opening sensor can be programmed to open the flexible shutter automatically upon detection of one or more of the following opening signals individually or in combination:

(a) Detection of a movement within a given area around the flexible fast door;
(b) Detection of a person or object within a given area around the flexible fast door; The presence of a person can be detected by an infrared camera recording the heat of the body,
(c) Detection of digital credentials within a given area around the flexible fast door; the digital credential can be stored in a magnetic card worn by the operator, and detected by a sensor, (d) Optical detection of a graphical element worn by an accredited operator; the graphical element can be worn as a badge sewn or picked on the coverall or uniform of the operator, or on a hat
(e) Detection of a wave signal or of the presence of a transponder; like for the remote control, any wave frequency can be used,
(f) Detection of a voice signal.
(g) Detection of the closing of the rigid door. This is particularly important for embodiments wherein the rigid door cannot be closed when the flexible shutter is closed, as illustrated in FIGS. 4(c)&(d) and 5(b)&(c).

The closing sensor, on the other hand, can be programmed to close the flexible shutter automatically upon detection of one or more of the following closing signals individually or in combination:
(a) Detection of the passage of a person through the opening; this solution reduces to a strictest minimum the time the opening (2) remains open.
(b) Loss of a signal indicating the presence of a person or object within a given area around the flexible fast door; once the sensor loses track of an opening signal as discussed supra, the flexible shutter can be closed automatically. The same applies for the,
(c) Loss of a wave signal;
(d) Detection of a voice signal; as for the opening voice signal, a second sound can be used to close the flexible shutter.
(e) Expiration of a pre-set opening time.

For safety reasons, in particular—albeit not exclusively—with an automatic closing of the flexible shutter after expiration of a pre-set opening time; the flexible fast door may further comprise a safety feature preventing an automatic closure of the flexible shutter in case the presence of an object or person is detected within a given area around the flexible door. This can consist of for example a wave emitter mounted on one lateral edge of the opening, and a wave receptor or reflector mounted on the opposite edge. When the wave is interrupted, it is indicative of the passage of a person or object through the opening. All the opening and closing sensors mentioned supra are well known to a person skilled in the art, who knowns which sensor or combination of sensor will best suit the needs of a specific application.

With any one or any combination of the foregoing means for activating the motorized closing and opening of the flexible fast door, an operator in charge of loading and unloading part or all the cargo stored in the inner space of the housing finds it very easy, even with its hands full, to close the flexible shutter for the whole time it is not required to cross through the opening, and to open the flexible shutter only instants before the opening must be crossed. This ensures a higher stability of the temperature and humidity reigning in the inner space. In case the inner space is refrigerated, special flexible curtains or articulated shutters with high thermal insulation properties may be used. The present invention also prevents unauthorized people from trespassing into the inner space of the housing, when the operator is out of sight, e.g., delivering goods to the recipient or collecting goods to be loaded. The flexible shutters, even flexible curtains, traditionally used for flexible fast doors are generally made of a fabric coated with a polymeric layer (e.g., PVC), and are usually quite resistant and difficult to rip open without specific cutting tools. In case of a relatively precious cargo, special curtains can be used comprising fabrics made of a material having a high resistance to cutting. For example, polyaramide fibres can be used (e.g., Kevlar® or Twaron®) or ultra-high molecular weight polyethylene (UHMWPE) (e.g., Dyneema'R)) can be used to form the fabric of the curtain.

| Ref | DEFINITION |
| --- | --- |
| 1 | housing for storing a cargo |
| 1E | edge of opening |
| 1F | door frame |
| 1G | groove in edge of opening |
| 1i | closed inner space of housing |
| 1R | walls of the housing defining the inner space (1i) |
| 2 | Opening |
| 3 | rigid panel of rigid door |
| 3G | groove in rigid panel |
| 3H | rigid door hinge |
| 4 | flexible shutter of motorized flexible fast door |
| 4D | storing drum of flexible shutter (4) |
| 4H | shutter hinges between laths (4S) |
| 4L | leading edge of the flexible shutter |
| 4S | laths hinged to one another to form an articulated shutter |
| 7 | guiding rail |
| 7T | transverse guiding rail |
| 10 | driving mechanism |

The invention claimed is:

1. A housing for the transportation of a cargo comprising:
(a) walls defining a closed inner space suitable for storing a cargo,
(b) an opening provided in one of the walls and giving access to the closed inner space from an outer atmosphere, and further comprises a rigid door comprising one or more rigid panels which are movable to seal or unseal said opening;
(c) a flexible fast door comprising a motorized driving mechanism suitable for moving a leading edge of a flexible shutter in a first direction to close the flexible shutter and thus seal said opening, and in a second, opposite direction to open the flexible shutter and thus unseal said opening, when said opening is unsealed by the rigid door,
wherein the flexible shutter comprises two lateral edges engaged in parallel guiding rails fixed to two parallel and opposite edges of the opening,
wherein the rigid panel and/or the parallel edge of the opening is provided with a groove to accommodate the guiding rails, and
wherein when the flexible shutter seals the opening, the flexible shutter occupies space that is occupied by the rigid panel when the rigid panel seals the opening.

2. The housing according to claim 1, selected among one of the following:
a truck trailer;
a cargo housing mounted on the chassis of a truck;
a cargo compartment in a van;
an intermodal freight container; or
a freight train wagon.

3. The housing according to claim 1, wherein the flexible shutter is selected from a flexible curtain or an articulated shutter formed by a series of parallel laths hinged to one another parallel to the leading edge and wherein when the flexible shutter is at least partially open, the portion of flexible shutter not sealing the opening is stored either
(a) rolled-up around a storing drum or
(b) partially wrapped about a rotating axle and stretched in a storing direction, transverse to the direction along which the leading edge is moved to open and close the flexible shutter.

4. The housing according to claim 3, wherein the motorized driving mechanism drives the moving of the leading edge in one of the following ways:
   (a) the motorized driving mechanism drives the rotation of the storing drum or of the rotating axle to move the leading edge in a first direction to close the flexible shutter and in a second direction to open the flexible shutter, or
   (b) the motorized driving mechanism pulls or pushes linearly the flexible shutter.

5. The housing according to claim 1, wherein the temperature and/or humidity in the inner space are controlled.

6. The housing according to claim 1, wherein the guiding rail does not protrude further towards the inner of the closed inner space than the rigid panel does when the rigid panel seals the opening.

7. The housing according to claim 1, wherein the rigid panel is provided with the groove such that the guiding rail is nested when the rigid panel seals the opening.

8. The housing according to claim 1, wherein the parallel edge of the opening is provided with the groove such that the guiding rail is accommodated flush with a plane defined by said edge.

9. The housing according to claim 1, wherein the flexible shutter is prevented from being closed to seal the opening while the rigid panel of the rigid door seals the opening.

10. The housing according to claim 1, wherein the parallel guiding rails define two sides of the opening, and wherein the leading edge links the two lateral edges, and moves along the direction defined by the guiding rails upon closing and opening the flexible shutter.

11. The housing according to claim 1, wherein the opening is limited either by edges defined by the portion of wall surrounding the opening, or by edges of a door frame.

12. The housing according to claim 1, wherein said edges have a thickness, and wherein the guiding rails do not protrude beyond the thickness of the edges.

13. The housing according to claim 1, wherein the motorized driving mechanism can be actuated to open and close the flexible door by means of one or more of:
   a switch mounted in the vicinity of the flexible door, and/or
   a remote control, and/or
   an opening sensor programmed to open the flexible shutter automatically upon detection of an appropriate opening signal, and/or
   a closing sensor programmed to close the flexible shutter automatically upon detection of an appropriate closing signal.

14. The housing according to claim 13, wherein the motorized driving mechanism can be actuated to open and close the flexible door by means of an opening sensor programmed to open the flexible shutter automatically upon detection of an appropriate opening signal, wherein the opening sensor is programmed to open the flexible shutter automatically upon detection of one or more of the following opening signals individually or in combination:
   (a) detection of a movement within a given area around the flexible fast door;
   (b) detection of a person or object within a given area around the flexible fast door;
   (c) detection of digital credentials within a given area around the flexible fast door;
   (d) optical detection of a graphical element worn by an accredited operator;
   (e) detection of a wave signal or of the presence of a transponder;
   (f) detection of a voice signal; and
   (g) closing of the rigid door.

15. The housing according to claim 13, wherein the motorized driving mechanism can be actuated to open and close the flexible door by means of a closing sensor programmed to close the flexible shutter automatically upon detection of an appropriate closing signal, wherein the closing sensor is programmed to close the flexible shutter automatically upon detection of one or more of the following closing signals individually or in combination:
   (a) detection of the passage of a person through the opening;
   (b) loss of a signal indicating the presence of a person or object within a given area around the flexible fast door;
   (c) loss of a wave signal;
   (d) detection of a voice signal; and
   (e) expiration of a pre-set opening time.

16. The housing according to claim 1, further comprising a safety feature preventing an automatic closure of the flexible shutter in case the presence of an object or person is detected within a given area around the flexible door.

17. A housing for the transportation of a cargo comprising:
   (a) walls defining a closed inner space suitable for storing a cargo,
   (b) an opening provided in one of the walls and giving access to the closed inner space from an outer atmosphere, and further comprises a rigid door comprising one or more rigid panels which are movable to seal or unseal said opening; and
   (c) a flexible fast door comprising a motorized driving mechanism suitable for moving a leading edge of a flexible shutter in a first direction to close the flexible shutter and thus seal said opening, and in a second, opposite direction to open the flexible shutter and thus unseal said opening, when said opening is unsealed by the rigid door,
     wherein the flexible shutter comprises two lateral edges engaged in parallel guiding rails fixed to two parallel and opposite edges of the opening,
     wherein the rigid panel and/or the parallel edge of the opening is provided with a groove to accommodate the guiding rails, and
     wherein the guiding rail does not protrude further towards the inner of the closed inner space than the rigid panel does when the rigid panel seals the opening.

18. A housing for the transportation of a cargo comprising:
   (a) walls defining a closed inner space suitable for storing a cargo,
   (b) an opening provided in one of the walls and giving access to the closed inner space from an outer atmosphere, and further comprises a rigid door comprising one or more rigid panels which are movable to seal or unseal said opening;
   (c) a flexible fast door comprising a motorized driving mechanism suitable for moving a leading edge of a flexible shutter in a first direction to close the flexible shutter and thus seal said opening, and in a second, opposite direction to open the flexible shutter and thus unseal said opening, when said opening is unsealed by the rigid door,
     wherein the flexible shutter comprises two lateral edges engaged in parallel guiding rails fixed to two parallel and opposite edges of the opening, wherein the rigid panel and/or the parallel edge of the opening is provided with a groove to accommodate the guiding rails, and wherein the rigid panel is provided with the groove such that the guiding rail is nested when the rigid panel seals the opening.

\* \* \* \* \*